United States Patent [19]

Stucky

[11] Patent Number: 5,649,192

[45] Date of Patent: Jul. 15, 1997

[54] SELF-ORGANIZED INFORMATION STORAGE SYSTEM

[75] Inventor: Robert Bruce Stucky, San Jose, Calif.

[73] Assignee: General Electric Company, San Jose, Calif.

[21] Appl. No.: 4,010

[22] Filed: Jan. 15, 1993

[51] Int. Cl.⁶ .......................... G06F 17/30; G06F 17/21
[52] U.S. Cl. .................. 395/614; 395/611; 395/612; 395/792; 395/803
[58] Field of Search ........................... 395/600, 148; 364/419.14, 419

[56] References Cited

U.S. PATENT DOCUMENTS

| | | | |
|---|---|---|---|
| 4,941,125 | 7/1990 | Boyne | 364/900 |
| 5,115,504 | 5/1992 | Belove et al. | 395/600 |
| 5,133,067 | 7/1992 | Hara et al. | 395/600 |
| 5,144,555 | 9/1992 | Takadachi et al. | 364/419 |
| 5,159,667 | 10/1992 | Borrey et al. | 395/148 |
| 5,175,848 | 12/1992 | Dysart et al. | 395/600 |
| 5,267,155 | 11/1993 | Buchanan et al. | 364/419.14 |
| 5,388,196 | 2/1995 | Bajak et al. | 395/153 |

Primary Examiner—Thomas G. Black
Assistant Examiner—Cheryl Lewis
Attorney, Agent, or Firm—James E. McGinness

[57] ABSTRACT

A textual database system in which concepts, i.e. blocks of text which are related or rely upon one another, are linked together by a database engine. Numerical variables can be embedded in text, which text is automatically updated as those variables change. As a textual document is being written, the system enables authors to record their thoughts, attaching them to the relevant sections of the document. It electronically captures and stores references to other reports or databases. As references are made, the system automatically establishes bi-directional links between the pieces of information. Also the genealogy of first and later versions of a textual block is recorded automatically.

6 Claims, 3 Drawing Sheets

SELF-ORGANIZED INFORMATION STORAGE SYSTEM

FIELD OF THE INVENTION

This invention relates generally to a method for storing information in a computer system. Specifically, the invention relates to a method for constructing a database which organizes the data in an evolutionary and inherently optimized manner.

BACKGROUND OF THE INVENTION

Human knowledge is a vastly complex network of linked facts, ideas, and experiences. When one fact is thought about, many other related facts come to mind. When a person gains enough expertise, the mention of a topic can trigger that person's mind to visualize the entire mass of related information in one memory event.

According to the field of study known as fractal geometry, any object can be described or modeled by its component parts, i.e., "fractals". Knowledge is also a fractal. For example, the product line of a company that makes different types of power plants can be viewed as a collection of power plant classes, which are collections of power plants, which are collections of systems, which are collections of design specifications, which are collections of sections, which are collections of words and numerical values.

When information is stored, it is usually an attempt to record information and share it between humans. In this process, a person takes a certain piece of information and stores it with other related information, hopefully in a place where it can be found in the future. The information stored is presented in context and with a goal. For example, in the case of a design specification, an engineer is attempting to present how an item must be designed and constructed. In the context of a design specification, it is usually not appropriate for an engineer to dwell on why an engineering requirement exists or the underlying thought behind it.

To a technical expert, an engineering requirement can be considered a trigger for thought. As an expert reads a section of a design specification, that expert will visualize most of the related technical information, and what cannot be visualized or remembered, the expert knows how to retrieve. In other words, an expert knows how the specialized information in his field of technical expertise is linked.

When data is entered into storage, the fractal organization (i.e. the links) of the knowledge is destroyed. In order for another person to benefit from that stored information, it is necessary for that person to recreate some level of that organization. This is done by researching the subject matter, consulting with experts, and reviewing related material. A piece of text or block of data is of limited value without at least some of the background knowledge which supports it.

Simply storing information in a conventional computer database does not ameliorate the situation because neither relational nor object databases will link data items unless told to do so. Thus, in the context of data representation, the crux of the problem inherent in conventional computerized information storage systems is that knowledge is a fractal, whereas the data, as it is conventionally stored, is not.

Text can also be represented as a fractal organization of ideas or facts. Documents consist of paragraphs, which consist of sentences, which consist of words, which consist of characters. However, since computers are sequential processors, the natural evolution of computerized text processing followed the most technically straightforward approach: it was based upon the sequential processing of characters.

Conventional document management systems provide a number of indexing features to allow authors to describe what is in a document, so that others can locate information relevant to their needs. None of these systems, however, process text at the paragraph, sentence, or word level (as required) in order to provide the ability to directly access and link related information object by object.

In some systems, documents are broken into paragraphs which are stored in a database. These paragraphs are then used in a number of different documents, as appropriate. This is an example of what could be termed a three-dimensional system. The first dimension is a "text object", or paragraph. The second dimension is a collection of paragraphs, which would manifest itself as a section or document. If the one-dimensional text objects are used in more than one document at a time, the system could be considered three-dimensional. Such a three-dimensional system allows the multiple use of single text objects, which is a tremendous productivity tool at the authoring and publishing stages.

Some systems also allow for version control at the document level, which in a limited sense could be considered the fourth dimension. These would not be true four-dimensional systems because version control in and of itself only records "snap shots" of the state of a document at discrete points along the time continuum. As each version is released, a snap shot of the system configuration is recorded. Immediately following a version release, the database is by definition out of date with the latest thinking of its contributors.

SUMMARY OF THE INVENTION

The present invention is a new concept in textual data storage and retrieval. It uses an object-oriented architecture to allow technical documents to be stored as a collection of concepts or "objects". These objects are then linked to one another in the course of drafting a document.

The end result is a textual database system in which concepts, i.e. blocks of text which are related or rely upon one another, are linked together by a database engine. The system of the invention has the power to embed numerical values in text, and update text as those values change. It provides a way to notify authors when changes are required to their documents due to the modification of supporting objects.

As a textual document is being written, the system of the invention provides an easy-to-use method that enables authors to record their thoughts, attaching them to the relevant sections of the document. It electronically captures and stores references to other reports or databases. As references are made, the system automatically establishes bi-directional links between the pieces of information.

This invention can be envisioned as a means for taking the output of a word processor and recording the dependencies between blocks of text. It allows values from other databases to be incorporated into text, while creating a bi-directional link with the database.

The guiding principle of the method of the invention is that any section of any document must carry enough information for it to be verified independently. Between references to controlled documents and to electronic design record files, as well as the text of the section itself, a verifier should be able to determine that the statement made is valid.

The invention stores a document in a database, section by section. Each section is identified with a unique number. For example, the following exemplary section was taken from the RCIC System specification for the Laguna Verde boiling water reactor:

4.1.2 The RCIC System shall have a make-up capacity sufficient to prevent the reactor vessel water level from dropping to the top of the core. (The flow rate is approximately equal to the reactor water boil-off rate 15 minutes after shutdown.)

An individual reading this Requirement without significant knowledge of the RCIC System would not know what it means, nor would they be able to find out, without the help of an expert.

In accordance with the invention, this Requirement is assigned a unique identification number. Another statement constituting the Basis for this Requirement could be made. When the Basis statement is stored in the system, it is assigned the same identification number as that assigned to the Requirement section. Thus, the two statements are classified as different types of data, but are linked together as a single entity. The goal of the invention is to enable authors to record basis and supporting information as a part of the drafting process.

During printing, the system queries the user what data types should be printed. If the user responds by identifying only the data type "Requirement", then the Requirements would be printed without Basis statements. However, the Basis statements would remain in the database, readily available to anyone needing them. The amount of such information which can be stored with a Requirement section is functionally unlimited.

Another aspect of the invention is that it frees authors from dealing with the issues of text formatting. The system's output will use the Standard Generalized Markup Language (SGML). By using SGML, unformatted blocks of text can be quickly converted to final form documents by programs like FrameMaker.

The invention is useful, for example, in designing nuclear reactors or power plants. It allows a document to carry within itself any information which would not be relegated to a design record file. If a section is justified by a hand calculation, in accordance with the invention, the image of the calculation is scanned, digitized and attached directly to that section. The calculation would be instantly available to anyone reviewing the work.

It is also fundamentally possible, using the invention, to write a design basis document in a standard format and to an appropriate level of depth. Once such a document has been prepared for one power plant system, it would be cloned into documents for like systems of other power plants. This maximizes the benefit of the commonality of a given series of power plants.

The final document becomes a database which has tremendous value in servicing equipment such as nuclear reactors and other power plants. It would be used to answer customer questions as well as track the impact of proposed modifications, life extensions and so forth.

Furthermore, if specifications were written in accordance with the invention, the following benefits would result: (1) engineering requirements would be directly supported by technical information in the database; (2) references to other sections of other documents would be preserved electronically; (3) numerical values from other databases could be incorporated into the text; (4) as numerical values or sections change, authors of sections which depend on the modified information could be notified (or consulted prior to the modification); and (5) it would be possible to use the resulting database to estimate the overall impact of a proposed modification.

BRIEF DESCRIPTION OF THE DRAWINGS

These and other advantages of the invention will be better understood when the detailed description of the preferred embodiments of the invention is read in conjunction with the drawings, wherein.

DETAILED DESCRIPTION OF THE PREFERRED EMBODIMENTS

Figure 1:
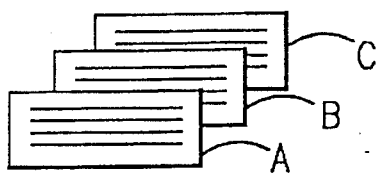
FIG. 1 is a diagram depicting a two-dimensional text object in accordance with the invention.

By establishing links between paragraphs or "sections" (which should be concisely presented ideas), the invention stores a representation of the thought path used in the creation of a document. The invention works by storing data in a model structured to preserve a few of the attributes of human knowledge.

Storing textual information in sequential strings of characters is convenient only to computer programmers. In an object model, as information is generated it is stored in discrete chunks in a database. Each chunk can be viewed as a stand-alone "concept". In the software world, these chunks are called "objects". An object can take the form of textual, graphic, numerical, sound, video or any other kind of information. By breaking text into logical, valuable objects or concepts and storing the text as a fractal, it is possible to quickly and easily link concepts. It is also possible to have these objects "know" where to find supporting information, like numerical values from other databases. If the guiding principle, i.e., that each section carry enough information for it to be independently verifiable, is followed, then the result is a database of linked concepts which will, to some degree, represent the process the engineers used in creating the design. Once these objects are in the database, they can be manipulated by the database engine as well as by a word processor, spreadsheet, sound recording software, animation software etc. The object itself tells the computer what kind of information it carries and how to process it.

In accordance with the information storage method of the invention, information objects carry three essential kinds of information: data, attributes and event handlers.

A given information object can have as many pieces of data as necessary to adequately define the object. For an object which is part of a design specification, a Requirement and a Basis for that Requirement are two natural data types. Information Designer's Note could be a third. A given information object should contain enough data to allow it to be "verified" independently of other objects.

Objects are given "attributes" which can be used to help identify them, as well as define access privileges, or control the document revision process. Examples of attributes are: Name, Author, Verifier, Owner, Revision, and Equipment (e.g., Pump, Valve). Attributes are inherited automatically, i.e., a child is given the attributes of its parent. It is also possible for an attribute of a child object to override the corresponding attribute of the parent object. For example, a design specification has three attributes: Author, Owner, and Verifier. Sections and sub-sections of the design specification are automatically given the same attributes. If verification of this specification were behind schedule, the Manager would have the ability to establish a new attribute, e.g., a Verifier for a particular section. Thereafter, the entire particular section could be verified by a different individual. Conceptually, the new Verifier for the particular section would override the Verifier listed for the entire document. All of the sub-sections under the particular section would inherit the new Verifier as well.

In accordance with the invention, objects send and receive "events". When an object is called from the database, it receives an Open event. Other events include Save, Close, Changed, New and Delete. This list is not exhaustive and users have the ability to define the names and actions of events at will.

Upon receiving a Changed event, the object could in turn tell the system to send the same message to all objects which both use and reference it. The technique allows an object's owner to make a modification to a verified object (the verified version is saved), and have the verifier automatically notified of the need to re-verify the object. Furthermore, any object which used the modified object would be directly informed of that object's modification.

In accordance with the invention, an object can comprise text combined with a numerical value. An example is the following:

4.2.5 The required starting time for the RCIC System from receipt of actuation signal to delivering design flow shall be within 30 seconds.

In this example, there are actually two objects: one is the text and the other is the numerical value, 30 seconds. The relationship between these objects is called "object dependency". In other words, the Section 4.2.5 object is dependent on the "30 second" value object. When the Section 4.2.5 object receives an object event, it will instruct the system to retrieve (from the appropriate database) its supporting value and insert it into the paragraph at its proper location.

The information storage system in accordance with the invention is able to link information in six dimensions. All discrete chunks of information are stored as objects, in the classic object-oriented programming (OOP) paradigm.

The first-dimensional text object in accordance with the invention is a paragraph. As shown in FIG. 1, for its second dimension, the invention allows an author to store multiple pieces of information (B and C) in "layers" behind the first-dimensional text object A. These layers can contain virtually any type of data, including text, graphic, sound, video, spreadsheet file, code fragment, etc. The idea is to build a two-dimensional object which is as complete an entity (or concept) as possible.

Figure 2:
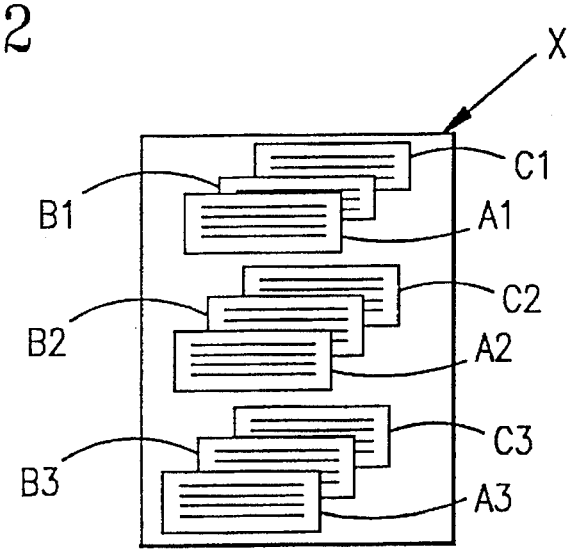
FIG. 2 is a diagram depicting a three-dimensional text object in accordance with the invention.

The third dimension arises when groups of objects A1, A2, and A3 are collected to form sections of a document X (see FIG. 2). This kind of document is most useful in its "live" form, i.e. when viewed on a computer, interactively with the database. In such a scheme, the hidden layers (B1, C1, etc.) are available with the click of a mouse button. In a paper manifestation of a three-dimensional document, the person printing (as opposed to the author) would have the option of including in the printed document the desired layers of information by appropriate selection of data types.

Figure 3:
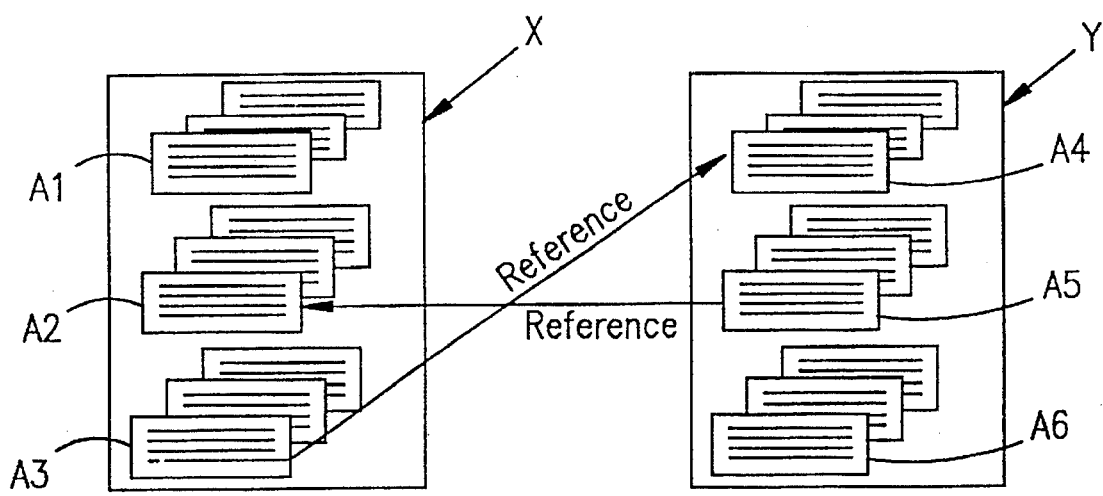
FIGS. 3 and 4 are diagrams respectively depicting the fourth and fifth dimensions in accordance with the invention.

The way to most efficiently build a two-dimensional text object is to use information which already exists in the database in one form or another. Copying that information into an object layer, however, would be wasteful. Moreover, the incorporation of information from other sources into a document makes the author of that document accountable for the maintenance of that information. The elegant solution is to allow objects to "reference" each other. This fourth dimension of the invention is depicted diagrammatically in FIG. 3.

In accordance with the referencing scheme of the invention, a text object (e.g., A3) in document X can be linked to another object (e.g., A4) in document Y in two ways. In the first method, the author explicitly tells the system that the referenced object supports the referencing object, although the citation is not apparent in the text of the document itself. In the second method, the "embedded" reference is identical to explicit referencing except that the referenced object is embedded into the text of the referencing object. The reference appears on the screen in the following form: <Ref: (informal name of reference)>.

Taking into account the way in which most documents are drafted, the most common kind of link, and perhaps the most powerful, between data objects is the result of copying one object to create another. Virtually every design document and most reports are largely created by copying and pasting sections of previously completed documents. The fifth dimension of the invention records the parent-child genealogy between copied objects.

Figure 4:
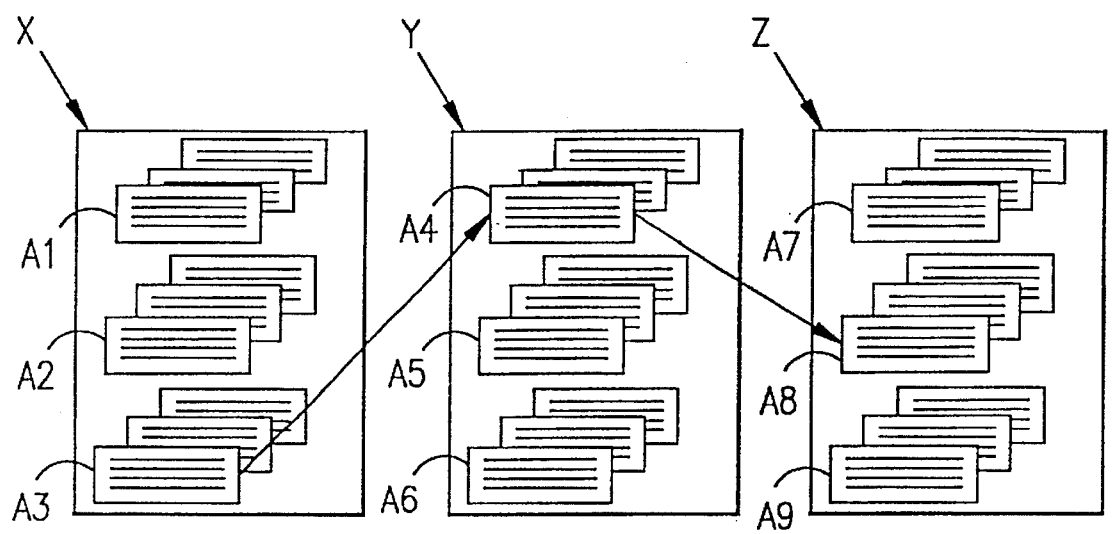

To copy an object from one document into another document, a copy screen appears on the monitor. First, the author selects, by pointing and clicking a mouse, the object to be copied, e.g., a section, from a Table of Contents which appears on the screen. The computer then turns all subsections to boldface. Using the mouse, the author selects a destination location and then selects the copy command. The computer performs line-by-line copying of each subsection from the source location into the destination location and makes new corresponding subsections by assigning unique object ID numbers. FIG. 4 illustrates the parent-child relationships between text objects of different documents. The respective object ID number of the source or parent subsection (e.g., A3 of document X) is then entered into the "parent" field of the object table for the corresponding destination or child sub-section (A4 of document Y).

In accordance with the invention, each text object is treated as a distinct and unique entity. The copy process stores the text and other layers of information of the parent into the child. However, once the copying is done, the child object is free to be edited and will have a life of its own.

The value of preserving this parent-child linkage becomes apparent when one considers that human learning is an iterative process. When information is copied from a previously completed design, with the intention of changing it to fit the current design philosophy, we are in fact tracking the evolution of a concept, complete with the reasons why one generation differs from its parent. A synonym for this kind of information is "experience." Done on a large enough scale, this simple relationship defines an expert systems technology far in advance of the current state of the art.

In accordance with the invention, this linkage is completely automatic. When an author makes the copy, the source object's identifier is recorded in the "parent" field (discussed in detail below) of the destination object table and the information constituting the source object is copied into the destination object. The entire link is completely transparent to the author and will happen independent of the author's actions. The automatic parent-child link allows the work in progress to "self-organize" the database across entire product structures.

In the case of operating procedures, descriptions of standard procedural steps in one document can be taken verbatim from another document simply by referencing the appropriate source objects in the objects making up the new document.

The sixth and final dimension is time. In the invention, version control happens at the object level. As a text object is revised, its latest version becomes instantly available to the entire system. Obviously, there are controls as to how a revision occurs (permission, notification, etc.). Thus, the database will always hold the latest configuration information.

The advantages of the invention are manifold. The system provides a high-productivity editing tool by allowing sections of one document to be quickly identified and copied as a template for new work. This system also establishes a link between source sections and destination sections so that the evolution of a concept can be tracked between similar applications of that concept. Further, the system provides live bi-directional linkage to a database of numerical values. It also links related concepts with a direct database record entry. The system allows text to be searched vertically in a document, and then radially along parent-child and referential links. The system provides configuration control at the paragraph or concept level. This means that the latest version of a concept (section) is available to all as soon as it is verified, as opposed to only being available when an entire document version is released. In addition, the system allows specific documents and sections of documents to be directly tied into a database of components. The recording of parent-child relationships, the referencing scheme and the storage of supporting information in accordance with the invention are each transparent to the user, that is, users of this system will require almost no retraining. The system records the thought processes used by an author by tracking his/her actions as he/she navigates through a database seeking information. The system further provides a method to ensure that a complex list of requirements specified in a Request for Quotation are met. Finally, the system in accordance with the invention supplements the documentation process by recording human knowledge, i.e. it inherently builds an expert system.

In accordance with a preferred embodiment of the invention, each valuable object (text or data) is given a unique 64-bit object identification number, which, in a table, is usually referred to as "o_id," or "o_xxx." The o_id is the key which allows objects to reference, use and embed into their text other objects.

The links between objects are stored in look-up tables which are processed by the RDBMS (Relational Database Management System) database engine (commercially available from Oracle). The main tables incorporated in the system are set forth below.

The Object table structure is as follows:

| o_id | num(38) | Object ID number |
|---|---|---|
| super | num(38) | ID of the object "above" this one |
| sub | num | Sequence number of objects below "super" |
| parent | num(38) | ID of the parent object or zero for no parent |
| class | num(38) | Object class |
| o_name | char(240) | Informal name of object |
| sect | char(240) | Textual section number (if taken from imported doc) |
| s_ref | num | Zero if it is a reference anchor for section numbering, the level down from the anchor otherwise. |

-continued

| o_str | char(240) | If class = header, then o_str = the text of the header |
|---|---|---|

This table stores the actual structure of the data in accordance with the invention. A document does not exist as a single entity in the database. Instead, each paragraph resides in the database as a separate object stored at a random location.

The Object ID is the data object's unique identifier. The "super" field identifies the object which is superior to the data object. Every object points to only one superior object, i.e., has only one value stored in the "super" field. A zero entry in the "super" field indicates that it is a highest level object. Class identifies what kind of object it is (Plant, System, Document, Letter, Valve, etc.). The informal object name allows you to refer to an object by name versus location in the product structure. The "s_ref" is a reference point for generating section numbers, and defining the distance up the chain that this object should look for most information.

Figure 5:
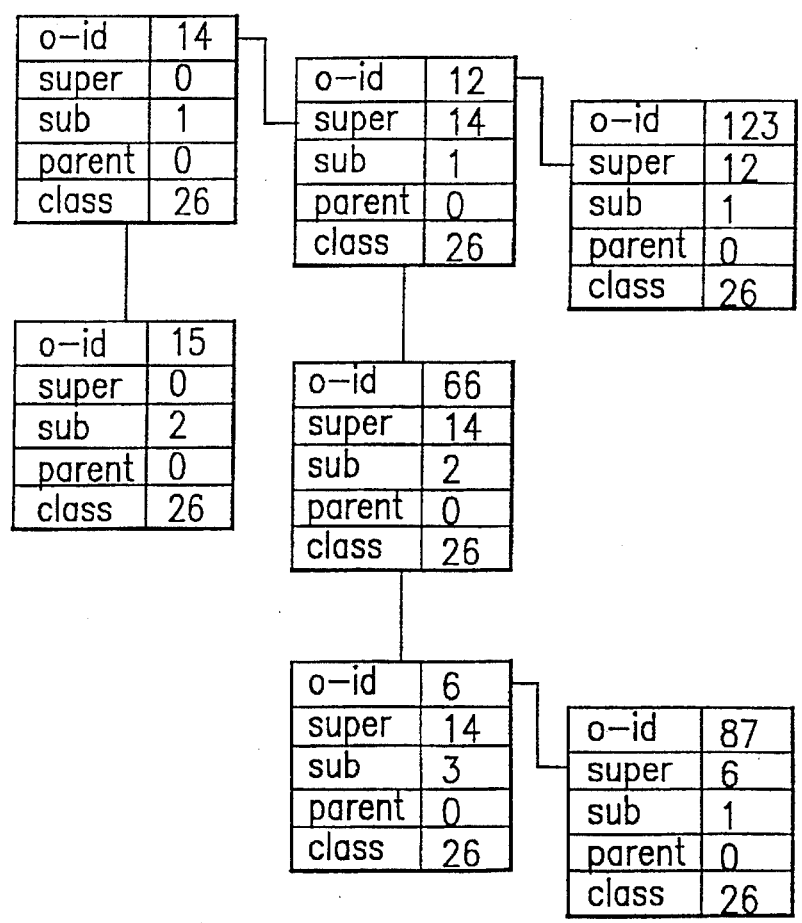
FIG. 5 is a diagram showing the organization of documents in accordance with the invention.

Documents are organized in the manner indicated in FIG. 5. The organization can be interpreted by noting the document section numbers that result:

| Section 1.0 | Object 14 |
|---|---|
| Section 1.1 | Object 12 |
| Section 1.1.1 | Object 123 |
| Section 1.2 | Object 66 |
| Section 1.3 | Object 6 |
| Section 1.3.1 | Object 87 |

A zero entry in the "parent" field indicates that all the objects in the document in FIG. 5 were "original thoughts." If one of the objects in FIG. 5 had been originally copied from a previous object in another document, its "parent" field would hold the object ID (o_id) of the source object.

In response to a print command, the document is "built" from component objects. The computer asks the user what data types should be printed. Only objects of that data type will appear in the printed document. The RDBMS database engine incorporates Structure Query Language (SQL) having a tree structure query routine. This tree structure query routine enables printing of the sections and sub-sections of a document in proper sequence. In response to entry of the object ID number of the top-level object of the document to be printed, the tree structure query routine retrieves each object below the top-level object in conformity with the section numbering scheme, utilizing the data stored in the "super" and "sub" fields. First, the database engine finds all other objects (hereinafter referred to as "second-level objects") whose "super" is the object ID of the top-level object and then orders those second-level objects in accordance with their "sub" values. Then the engine goes to the second-level object having the lowest "sub" value and finds other objects (i.e., third-level objects) whose super is the object ID of the second-level object having the lowest "sub" value and then orders those third-level objects in accordance with their "sub" values. This process continues until all objects in the document to be printed have been found.

The Data table structure is as follows:

| | | |
|---|---|---|
| o_id | num(38) | Object ID number |
| d_type | char(240) | The "type name" associated with this piece of data |
| d_fmt | char(240) | Data format stored - text, value, picture, sound, file, etc. |
| tag | char(240) | FrameMaker paragraph tag name |
| o_txt | long raw | The stored data itself, up to 64K in this version. |

This table is the actual storage repository for all of the data. Everything links back via the object ID and the data type, i.e., the d_type field.

The ref_str table structure is as follows:

| | | |
|---|---|---|
| o_id | num(38) | Object ID number |
| r_name | char(240) | Informal reference name |
| r_id | char(240) | Formal document ID number |
| r_doc | char(240) | Formal document name |
| val | char(240) | Last known value of reference |
| db_str | char(240) | Database connect string to access external objects |
| db_sql | long | Database "structure query language" (sql) statement to retrieve external objects |

This table is used to store specific information (a reference list) for objects whose class is "Reference." Note that this means that the reference list is actually made up of objects that are part of the structure of the document itself, i.e. it could be construed as an Appendix to the original document. Some objects, e.g., microfiche, are not stored in the system and therefore have no object ID number. Such references can be retrieved using the formal document ID number.

The ref_lst table structure is as follows:

| | | |
|---|---|---|
| o_src | num(38) | Source object |
| s_type | char(240) | Source object data type (for link into Main table) |
| o_ref | num(38) | Object referenced |
| r_type | char(240) | Reference object data type |
| nature | char(240) | Nature of the reference |

This table is the list of all references used in the entire system. It is possible, but not necessary, to link objects at the d_type level. One can also define a "nature" of a link, like "Supporting Information" or "Related Topic".

The Class table structure is as follows:

| | | |
|---|---|---|
| c_id | num(38) | Class ID number |
| class | char(60) | Class name |
| s_class | num(38) | Superclass |
| sub | num | Sequence number |

This table stores the class hierarchy in the same way that objects are ordered in the object table (see FIG. 5 as well). Each class ID is unique; the class text need not be. This allows for a large number of classes named "Document," each with their own place in the hierarchy and own set of attributes.

The ab_str table structure is as follows:

| | | |
|---|---|---|
| c_id | num(38) | Class ID number |
| ab | char(60) | Attribute name |
| ab_ab | char(240) | Attributes of the attribute |

| | | |
|---|---|---|
| val | char(240) | (Req, Opt) Possible value |
| v_ord | num | Order of that possible value |

This table lists defined attributes by class ID. The "val" field indicates a possible value for a given attribute. If multiple values are available, multiple entries are ordered by v_ord.

The ab_lst table structure is as follows:

| | | |
|---|---|---|
| o_id | num(38) | Object ID |
| ab | char(60) | Attribute |
| val | char(240) | Value of the attribute |

This table lists all attributes for all objects, and their current values.

The data str_table structure is as follows:

| | | |
|---|---|---|
| c_id | num(38) | Class ID |
| d_type | char(240) | Data type |
| d_fmt | char(240) | Data format |
| d_ab | char(240) | Attribute of data |

This table lists the data type associated with each class. If d_ab contains "Req", the data is required. If it contains the string "Num", it must be a numerical value. This syntax is extensible.

Although there are other data tables, the foregoing tables constitute the fundamental links established in accordance with the preferred embodiment of the invention.

Figure 6:
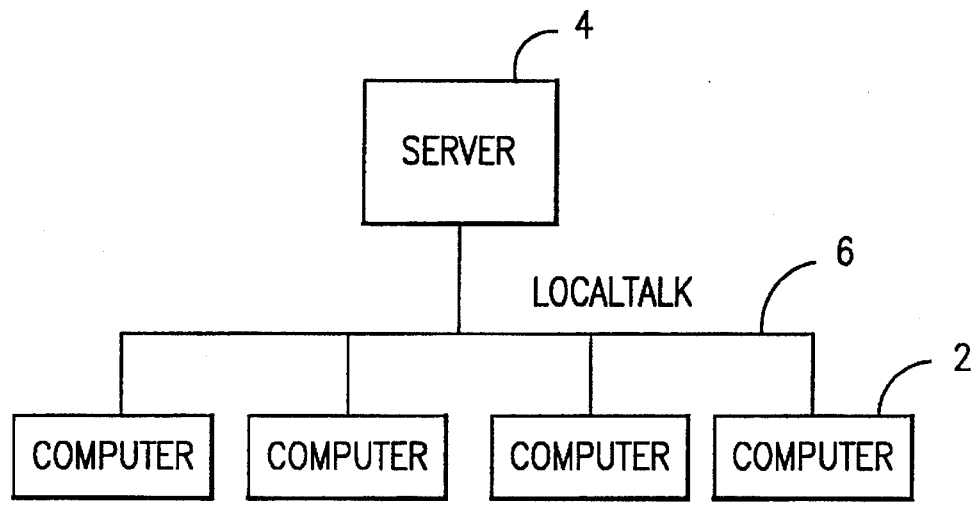
FIG. 6 is a block diagram depicting the architecture of the current implementation of the computer system in accordance with the invention.

The current implementation of the information storage system of the invention is a Macintosh network having the architecture shown in FIG. 6. A plurality of Macintosh computers 2 are connected to a Mac Quadra 950 server 4 by the built-in LocalTalk connection and software 6. Oracle Version 6.0 resides in the Mac Quadra 950 server, which has 64-MBRAM and a 1.3-GB hard drive. Each computer has conventional means for inputting commands and data, e.g., a keyboard and a mouse, as well as conventional means for displaying data, e.g., a video monitor.

Figure 7:
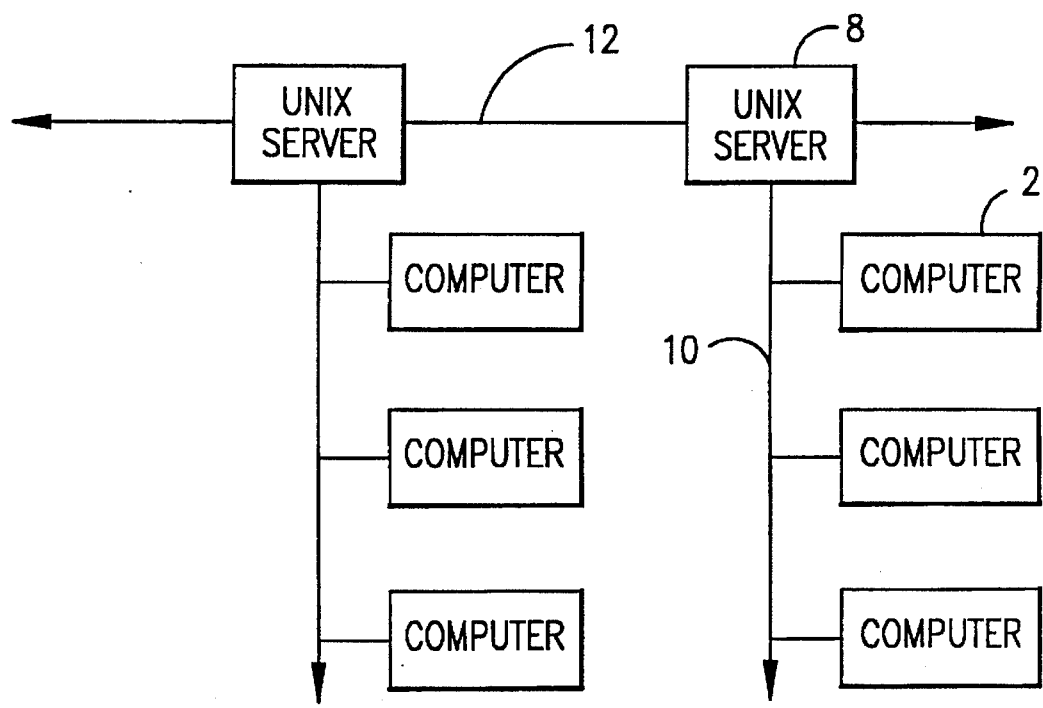
FIG. 7 is a block diagram depicting the architecture of an alternative implementation of the computer system in accordance with the invention.

A future possible implementation is shown in FIG. 7. This implementation will use Oracle Version 7.0 and allows multiple smaller machines to be used as if they were one big machine. In accordance with this implementation, a plurality of local UNIX servers 8, e.g., Sun workstations, are connected in parallel. Each UNIX server has a local area network 10 comprising a plurality of computers 2 connected thereto. The local area networks are used by respective local work groups. The UNIX servers are connected by a Banyan network. On a network like Banyan, the users are not physically connected to their local server. Fundamentally, all computers connected to the network can communicate with all other computers. The connection of computers 2 to servers 8 in FIG. 7 is intended to represent a logical, not a physical connection.

The idea behind the distributed server architecture is to give each work group the fastest access to and local control over their respective database. A user in one work group would have access to the database of another work group, but only via a direct request from a user for that kind of information. This architecture solves the problem posed by too many people wanting to use the system, i.e., that existing mainframes and networks will be unable to handle the computing load. By using local UNIX servers in parallel, the problem is broken up into chunks solvable with current technology, while allowing access to the mass of data when necessary.

The foregoing preferred embodiments have been disclosed only to illustrate the broad concept of the invention. It will be apparent to the skilled computer programmer that the hardware and software used to store and retrieve knowledge in accordance with the invention could be varied, modified and extended without departing from the spirit and scope of the claimed invention.

I claim:

1. A system for producing a document containing a selected plurality of document statements therein from data stored in computer memory, comprising:

means for storing a first table comprising a multiplicity of sets of data, each set of data of said first table comprising a self-contained information object stored independently of each other and representing a document statement to be included in a document to be produced and a corresponding unique identifier code identifying the information object;

means for storing a second table comprising a multiplicity of sets of data, each set of data of said second table comprising one of said identifier codes, an object class code indicating the class of objects to which the information object identified by said corresponding identifier code belongs, and document hierarchy data for indicating a hierarchical ordering of the document statement representing the information object identified by said corresponding identifier code relative to other document statements to be included in the document to be produced; and means for constructing a document consisting of a plurality of document statements arranged in hierarchical ordering and representing information objects selected from said first table in accordance with a desired object class code and ordered in accordance with said document hierarchy data as stored in the data sets of said second table, wherein said second table includes a first multiplicity of data sets containing identifier codes for superior information objects which may occupy a highest hierarchical ordering level in said document to be produced and a second multiplicity of data sets containing identifier codes for subordinate information objects which occupy any one of a plurality of successively lower hierarchical ordering levels in said document to be produced, said document hierarchy data for each data set of said first multiplicity including a first field containing an indicator that the corresponding superior information object occupies the highest hierarchical ordering level and a second field containing the ranking of the corresponding superior information object in relation to all other superior information objects to be included in said document to be produced, and said document hierarchy data for each data set of said second multiplicity including a first field containing the identifier code of the superior information object on a next higher hierarchical ordering level under which the corresponding subordinate information object is subsumed and a second field containing the ranking of the corresponding subordinate information object in relation to all other subordinate information objects subsumed under the same superior information object, whereby said system allows a multiplicity of document statements to be stored as self-contained object data independently of each other in computer memory and a document to be constructed of a selected plurality of such document statements which are arranged in sequence therein in accordance with their respectively indicated document hierarchical ordering level and ranking on each such level.

2. The system as defined in claim 1, further comprising means for inputting the identifier code of a top-level information object ranked first in the highest hierarchic level of said document to be constructed, wherein said document constructing means comprises means for retrieving each information object which is below said top-level information object in ranking or hierarchic level using a tree structure query routine to retrieve said information objects in accordance with the order determined by said hierarchy data in said second table.

3. The system as defined in claim 2, wherein each set of data of said second table further comprises the identifier code of a parent information object whenever the initial version of the information object corresponding to that data set was formed by copying that parent information object.

4. The system as defined in claim 1, further comprising means for storing a third table comprising a multiplicity of sets of data, each set of data of said third table comprising an identifier code identifying a corresponding information object of said document to be constructed and an identifier code identifying a corresponding reference object containing information which supports said information object.

5. The system as defined in claim 1, further comprising means for storing a third table comprising a multiplicity of sets of data, each set of data of said third table comprising an identifier code identifying a corresponding information object of said document to be constructed and an identifier code identifying a corresponding reference object containing information which is to be embedded in said information object when said document is constructed.

6. The system as defined in claim 1, wherein each data set of said first table further includes attribute data which identify attributes of the corresponding information object, said attribute data including a copy-genealogy code which is inherited by the corresponding information object automatically from and identifies a parent information object from which said corresponding information object was copied, whereby the evolution of an information object can be tracked as copied through successive parent information objects.

* * * * *